Patented May 9, 1939

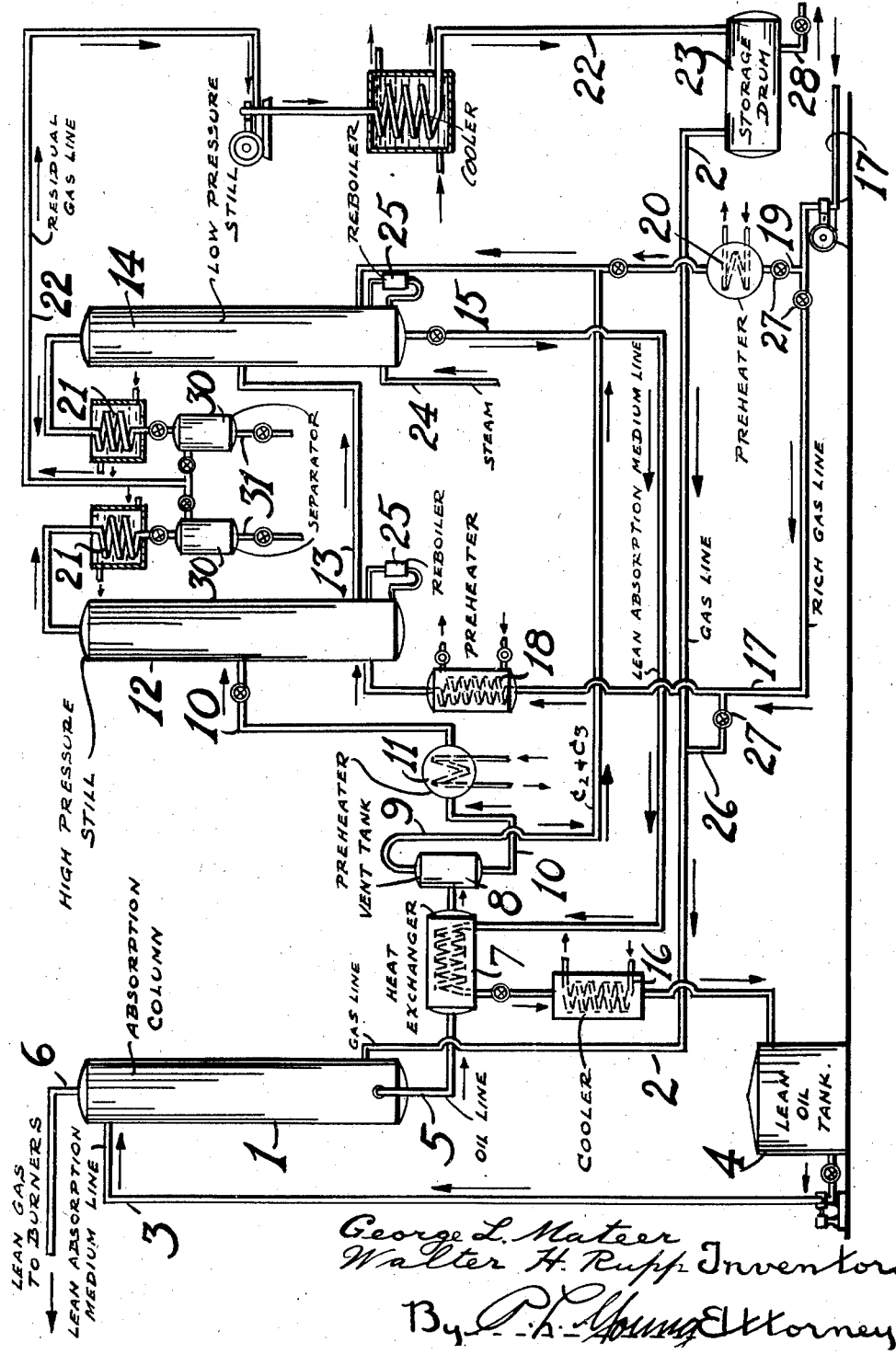

2,157,343

UNITED STATES PATENT OFFICE 2,157,343

ABSORPTION OF GASES

George L. Mateer, Roselle, and Walter H. Rupp, Elizabeth, N. J., assignors to Standard Oil Development Company, a corporation of Delaware Application September 18, 1936, Serial No. 101,352

3 Claims. (Cl. 196—8)

The present invention relates to a process for the recovery of hydrocarbons boiling within the gasoline range from gas mixtures containing the same, by absorption of said hydrocarbons from said mixtures by a suitable menstruum. It is particularly directed to an improvement in the method of recovering the gasoline hydrocarbons from the absorption medium.

In refinery operations, such as in the stabilization of naphtha, in cracking and in destructive distillation, large amounts of gases are formed, composed of methane, ethane, propane, and the corresponding olefines, and containing substantial quantities of higher hydrocarbons, such as butane, pentane, etc. Natural gases of similar composition are also obtainable. It is desirable to recover the $C_4$ and higher hydrocarbons from such gas mixtures, since these hydrocarbons may be employed directly in motor fuels.

It is customary to subject such gas mixtures to absorption conducted under conditions suitable for the absorption of the $C_4$ and higher hydrocarbons exclusively. The sharpness of the separation of $C_3$ and $C_4$ hydrocarbons depends upon the partial pressure of these constituents. The higher the partial pressure of $C_4$ and higher hydrocarbons, the more of these is it possible to absorb without absorbing undesirably large amounts of $C_3$ and lower hydrocarbons. The absorption medium, thus enriched in $C_4$ and higher hydrocarbons, is subjected to a stripping operation, such as steam stripping, for the removal of these constituents therefrom.

It has already been proposed, in a process of the type referred to above, to substitute the dry gas resulting from the absorption step for steam as a stripping agent in a low pressure stripping column for the absorption medium. This dry gas is composed mainly of $C_1$, $C_2$, and $C_3$ hydrocarbons. In stripping the absorption medium, this dry gas picks up some pentane and butane and must be recycled to the absorption tower for the recovery of these desired hydrocarbons.

The recycling of the stripping gas, containing smaller amounts of $C_4$ and higher hydrocarbons than the initial gas mixture to be subjected to absorption, produces a gas mixture having a lower partial pressure of the desired hydrocarbons than the initial gas mixture itself. Since absorption is a function of partial pressure, it follows that in order for the absorption medium to absorb all the desired hydrocarbons from the mixture of initial gas and recycle gas, it must absorb a larger quantity of propane and lighter gases than it would have to absorb from the initial gas mixture per se, in order to remove the desired hydrocarbons from it. It follows that a much larger amount of absorption medium is required for the recovery of the desired hydrocarbons than would be required for the initial gas mixture itself.

It has now been found that the chief advantage arising from the stripping of the absorption medium with dry gas, namely, a saving of steam, can be realized without the loss in capacity and selectivity of the absorption medium resulting from this procedure, and actually with an increase in capacity, that is, a decrease in the amount of absorption medium required for a given amount of initial gas, and, more important, with a substantial increase in the selectivity of the absorption medium on $C_4$ and higher hydrocarbons in the absorption chamber. According to the present invention, the gas which is to be subjected to absorption is employed as the stripping agent for the absorption medium in the low pressure or high pressure still, or both. In stripping the absorption medium, this gas becomes enriched in $C_4$ and higher hydrocarbons, whereby the partial pressure of the latter in said gas mixture is increased. Consequently, it is possible to absorb the $C_4$ and higher hydrocarbons from this enriched gas mixture by the absorption medium with a smaller absorption of $C_3$ and lighter hydrocarbons than would be the case with the initial gas mixture itself. Accordingly, the $C_4$ and higher hydrocarbons are more selectively absorbed from this gas mixture than would be possible if the initial gas mixture were scrubbed prior to its use as a stripping agent.

The absorption medium may be any relatively high boiling material known to have absorptive power for butane, pentane, etc. Generally, the medium employed is a petroleum oil which may boil within the range beginning with heavy naphtha and ending with gas oil. Kerosene or a light gas oil is particularly suitable for this purpose.

A front elevation of an apparatus suitable for carrying out the process of the present invention is shown in diagrammatic form in the attached drawing. Referring to the drawing in detail, 1 designates an absorption column to which is fed a rich gas through line 2 and a lean absorption medium through line 3 from lean oil tank 4. The fat oil leaves the bottom of the absorption tower through line 5 and the lean gas leaves the tower through line 6, which conducts it to burners, or to any processing equipment such as a fractionator, in which the $C_3$ hydrocarbons may be isolated and conducted to a polymerizing unit or an alcohol plant, the remaining $C_1$ and $C_2$ hydrocarbons being conducted to a hydrogen production unit.

The fat absorption medium passes through a heat exchanger 7 into a vent tank 8 from which a gas, mainly composed of $C_2$ and $C_3$ hydrocarbons, passes off through line 9, through which it passes to join the initial gas feed, the resulting fat absorption liquid leaving tank 8 through line 10 and passing through a preheater 11 into a high pressure still 12. The partially stripped absorption medium leaves still 12 through line 13, which conducts it to low pressure still 14 from which the lean absorption medium is conducted through line 15 to heat exchanger 7, then to water cooler 16, and thus back to the lean oil tank 4.

The rich gas to be subjected to absorption enters the system through line 17 in which it is conducted through a preheater 18 into the bottom of the high pressure still 12. A branch line 19 conducts part of the rich gas through preheater 20 into the bottom of low pressure still 14. The vapors leaving stills 12 and 14 are cooled by conventional water coolers 21 and discharged into separators 30 from which some of the higher hydrocarbons are drawn off through lines 31 and introduced into the tops of the respective towers as reflux, and the residual gases and recovered liquid hydrocarbons are passed through line 22 to a storage drum 23 from which the residual gases are pumped through line 2 to absorption tower 1. Drum 23 is maintained under a pressure suitable for the liquefaction of $C_4$ and higher hydrocarbons and is provided with a draw off line 28 for removing the recovered liquid hydrocarbons.

Although not shown on the drawing, a gas compressor and liquid pump is sometimes required to pump gas and liquid from low pressure separator 30 to storage drum 23.

Either one or both of the stills may be provided with a steam line 24 through which steam may be introduced to facilitate the stripping operation. Likewise each still is provided with a reboiler 25, of conventional design, by which the desired temperature is maintained in the bottom of the still. Feed line 17 is provided with a branch 26 connecting it with line 2, whereby excess feed gas above stripping requirements may be fed directly to the absorption tower. Lines 17, 19 and 26 are provided with valves 27 which may be manipulated so as to send all or part of the initial rich gas to either still or to the absorption column. It may be pointed out here that in actual operation the bulk of the gas is sent to the low pressure still 14.

In operation, the rich gas enters the system at approximately atmospheric temperature and under a pressure of about 130 lbs./sq. in gauge. The high pressure still is maintained at about 80 lbs./sq. in. and the low pressure still at about 10 lbs./sq. in. Upon leaving the stills, the gas, now further enriched in $C_4$ hydrocarbons, is cooled to water temperature, which is usually about 80° F. and may be between 50° and 90° F., at which temperature it enters the bottom of the absorption tower. The lean oil enters the top of the absorption tower at substantially the same temperature as the rich gas. This tower is usually maintained under a pressure of about 75 lbs./sq. in.

Due to heat of absorption, the fat oil leaves the bottom of the tower at a temperature ranging from 100 to 140° F. In heat exchanger 7 this temperature is brought to between 250° and 290° F., and in preheater 11 to a temperature between 305° and 345° F. at which it enters high pressure still 12. The temperature at the bottom of this still is held at between 300° and 340° F. Substantially the same temperatures are held in the low pressure still from the bottom of which the lean oil leaves at a temperature between 300° and 340° F. which, in heat exchanger 7, is reduced to a temperature between 110° and 150° F. and in water cooler 16 to between 50° and 90° F.

The nature and objects of the present invention having been thus described, what is claimed as new and useful and desired to be secured by Letters Patent is:

1. An improved process for recovering low boiling liquid hydrocarbons from gaseous mixtures containing the same, which comprises the steps of passing the gaseous mixture into a still in countercurrent relation to a rich absorbent oil containing both gaseous and normally liquid hydrocarbons, maintaining the still under superatmospheric pressure and at a temperature which is adapted to cause removal of the major part of the normally gaseous hydrocarbons while retaining the major quantity of $C_4$ and higher hydrocarbons, removing the partly stripped oil to a separate stripping zone maintained at a lower pressure and at a temperature adapted to vaporize the normally liquid absorbed constituents from the oil, separately condensing the overhead vapors from the two stills, withdrawing the uncondensed vapors, scrubbing the same with cooled stripped oil derived from the low pressure still and returning the oil to the high pressure still.

2. A process for separating hydrocarbons having at least four carbon atoms to the molecule from a gas mixture containing them in addition to $C_1$ to $C_3$ hydrocarbons, which comprises the gas mixture to a still maintained under superatmospheric pressure in stripping relation to an absorption medium rich in hydrocarbons having at least four carbon atoms to the molecule, discharging the partially stripped oil into a lower pressure still whereby further quantities of hydrocarbons having at least four carbon atoms to the molecule are vaporized, subjecting the overheads from the two stills to partial condensation, feeding the combined uncondensed gas released from the overheads to the bottom of an absorption zone, passing the lean oil to the top of said absorption zone from the second still, recovering fat oil from the bottom of said absorption zone and introducing it into the first still, the lean oil passing thru a heat exchanger in heat exchange relation to the fat absorption medium leaving the absorption zone whereby hydrocarbons having not over three carbon atoms to the molecule are forced out of solution in said fat absorption medium, leading off $C_1$ to $C_3$ hydrocarbons from the top of said absorption zone and recovering hydrocarbons having at least four carbon atoms to the molecule in each cycle by partial condensation of the overhead from each still prior to the passage of said combined uncondensed overhead to the absorption zone.

3. A process for separating hydrocarbons having at least four carbon atoms to the molecule from a gas mixture containing them in addition to $C_1$ to $C_3$ hydrocarbons, which comprises passing a portion of the gas mixture into a still maintained under superatmospheric pressure in stripping relation to an absorption medium rich in hydrocarbons having at least four carbon atoms to the molecule, discharging the partially stripped oil into a lower pressure still into which the remainder of the initial gas mixture is introduced in stripping relation to the absorption medium fed thereto, whereby further quantities of hydrocarbons having at least four carbon atoms to the molecule are vaporized, subjecting the overheads from the two stills to partial condensation, feeding the combined uncondensed gas released from the overheads to the bottom of an absorption zone, feeding the lean oil from the second still to the top of said absorption zone, recovering fat oil from the bottom of said absorption zone and introducing into the first still, leading off $C_1$ to $C_3$ hydrocarbons from the top of said absorption zone and recovering hydrocarbons having at least 4 carbon atoms to the molecule in each cycle by partial condensation of the overhead from each still prior to the passage of said combined overhead to the absorption zone.

GEORGE L. MATEER.
WALTER H. RUPP.